(12) United States Patent
Atmur et al.

(10) Patent No.: US 6,871,023 B2
(45) Date of Patent: Mar. 22, 2005

(54) SPREAD POLARIZATION TRANSMITTER AND ASSOCIATED SYSTEM AND METHOD OF OPERATION

(75) Inventors: Robert J. Atmur, Whittier, CA (US); Jeffrey H. Hunt, Chatsworth, CA (US)

(73) Assignee: The Boeing Company, Seattle, WA (US)

( * ) Notice: Subject to any disclaimer, the term of this patent is extended or adjusted under 35 U.S.C. 154(b) by 659 days.

(21) Appl. No.: 10/005,997

(22) Filed: Dec. 3, 2001

(65) Prior Publication Data

US 2003/0103771 A1 Jun. 5, 2003

(51) Int. Cl.$^7$ ................. H04B 10/00; H04B 10/04; H04J 14/00; G02F 1/01; G11C 19/08
(52) U.S. Cl. ............... 398/152; 398/184; 398/185; 398/200; 398/142; 398/43; 359/281; 359/246; 385/1; 365/22
(58) Field of Search .................. 398/152, 184, 398/185, 200, 142; 359/237, 238, 246, 276, 278, 279, 281

(56) References Cited

U.S. PATENT DOCUMENTS

| | | | |
|---|---|---|---|
| 3,534,347 A | | 10/1970 | Bobeck |
| 3,711,840 A | * | 1/1973 | Copeland, III ............... 365/22 |
| 3,756,690 A | * | 9/1973 | Borrelli et al. ............... 385/1 |
| 3,764,195 A | | 10/1973 | Blank et al. |
| 4,040,039 A | | 8/1977 | Hanson et al. |
| 4,056,812 A | | 11/1977 | Bobeck et al. |
| 4,095,279 A | | 6/1978 | Lins |
| 4,142,247 A | | 2/1979 | Bobeck |
| 4,142,249 A | | 2/1979 | Bobeck |
| 4,143,419 A | | 3/1979 | Bobeck |
| 4,143,420 A | | 3/1979 | Bobeck |
| 4,162,537 A | | 7/1979 | Bobeck |
| 4,355,373 A | | 10/1982 | Bobeck |
| 4,541,072 A | | 9/1985 | Kikuchi |
| 4,669,089 A | | 5/1987 | Gahagan et al. |
| 4,671,621 A | | 6/1987 | Dillon, Jr. et al. |
| 4,728,178 A | | 3/1988 | Gualtieri et al. |
| 4,735,489 A | | 4/1988 | Tolksdorf et al. |
| 4,866,698 A | | 9/1989 | Huggins et al. |

(List continued on next page.)

OTHER PUBLICATIONS

*Garnet Films*, GARNETS; <http://www.iem.it/~magni/work/doc/garnet–phd/garnets.html>; visited Aug. 8, 2000; pp. 1–48.

*New Material for Magnetic Bubble Memory*; STA TODAY; Aug. 1999; p. 1 <http://www.sta.go.jp/sonata/sonata/e9908_10.html>; visited Aug. 8, 2000.

Primary Examiner—M. R. Sedighian
Assistant Examiner—David J. Lee
(74) Attorney, Agent, or Firm—Alston & Bird LLP

(57) ABSTRACT

A spread polarization transmitter for transmitting at least one light signal comprises a spread-spectrum communication apparatus and a polarization modulator. The spread-spectrum communication apparatus modulates the at least one light signal according to a spread-spectrum modulation technique. The polarization modulator comprises a polarizer and a magnetic bubble waveguide. The polarizer is capable of polarizing the at least one spread-spectrum modulated light signal in a polarized direction. And the magnetic bubble waveguide, which is configured in accordance with a pseudo-random polarization code sequence such that the plurality of magnetic bubble domains assume a time varying position representative of the pseudo-random polarization code sequence, is capable of receiving at least one polarized, spread-spectrum modulated light signal. Thereafter, the magnetic bubble waveguide is capable of at least partially rotating the polarized, spread-spectrum modulated light signals by a predetermined angle from the polarized direction during transmission therethrough to create spread polarization modulated light signals.

20 Claims, 4 Drawing Sheets

U.S. PATENT DOCUMENTS

| | | |
|---|---|---|
| 4,985,899 A | 1/1991 | Walsh |
| 5,087,984 A | 2/1992 | Heiney et al. |
| 5,245,471 A | 9/1993 | Iwatsuka et al. |
| 5,287,300 A | 2/1994 | Stadler et al. |
| 5,341,396 A | 8/1994 | Higgins et al. |
| 5,657,151 A | 8/1997 | Swan et al. |
| 5,841,557 A | 11/1998 | Otsuka et al. |
| 5,867,290 A * | 2/1999 | Dutt et al. .................... 398/43 |
| 5,973,832 A | 10/1999 | Bettman |
| 6,002,512 A | 12/1999 | Bergmann et al. |
| 6,014,475 A | 1/2000 | Frisken |

* cited by examiner

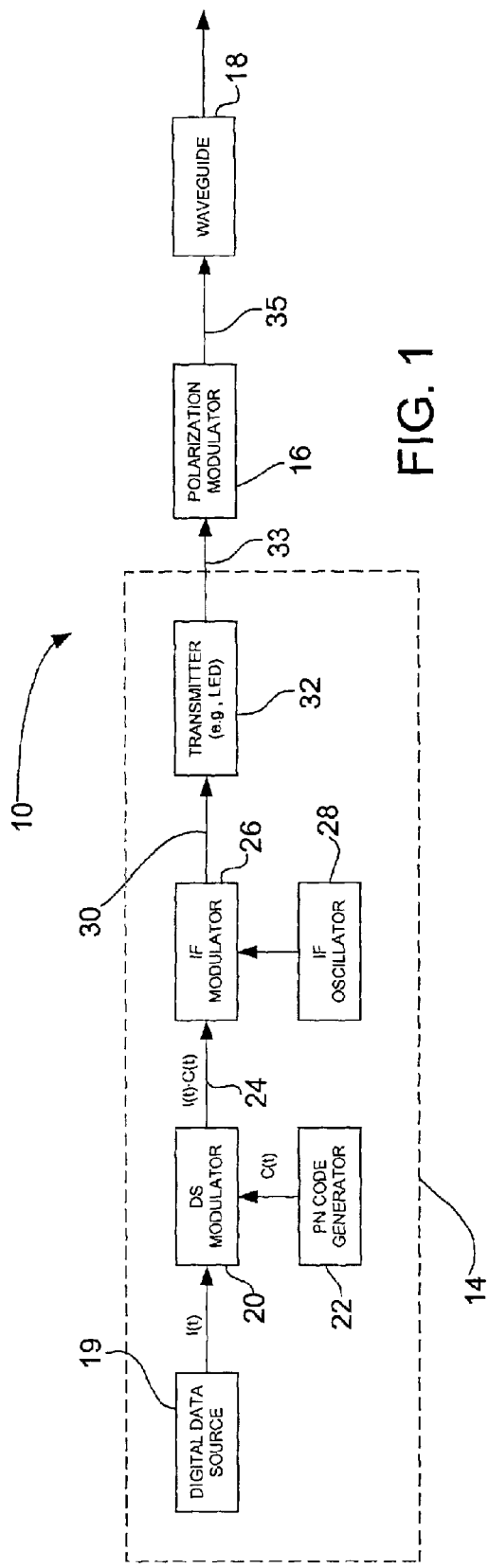
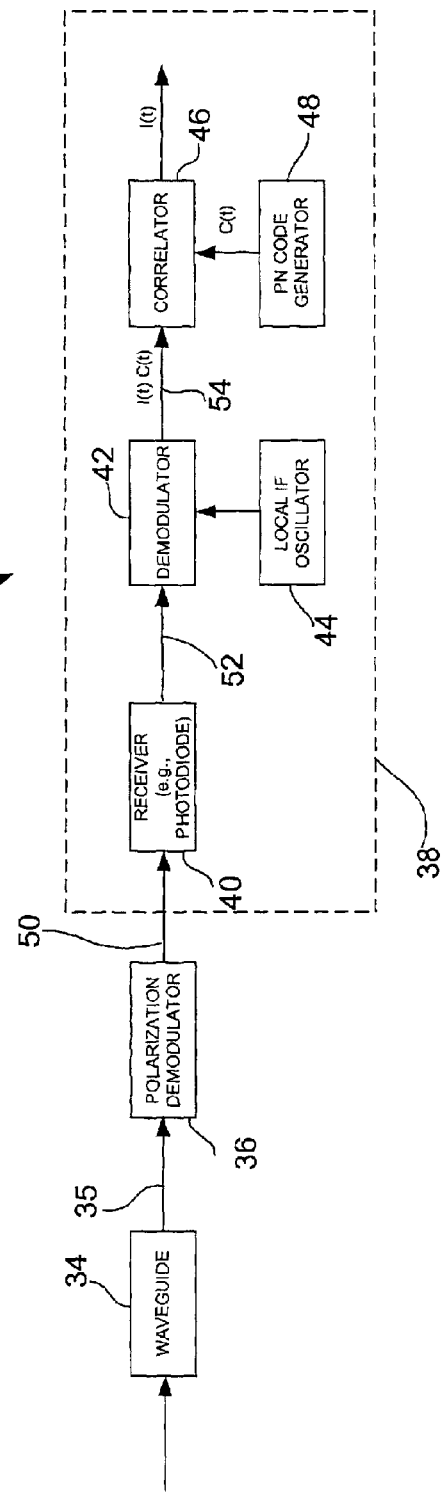

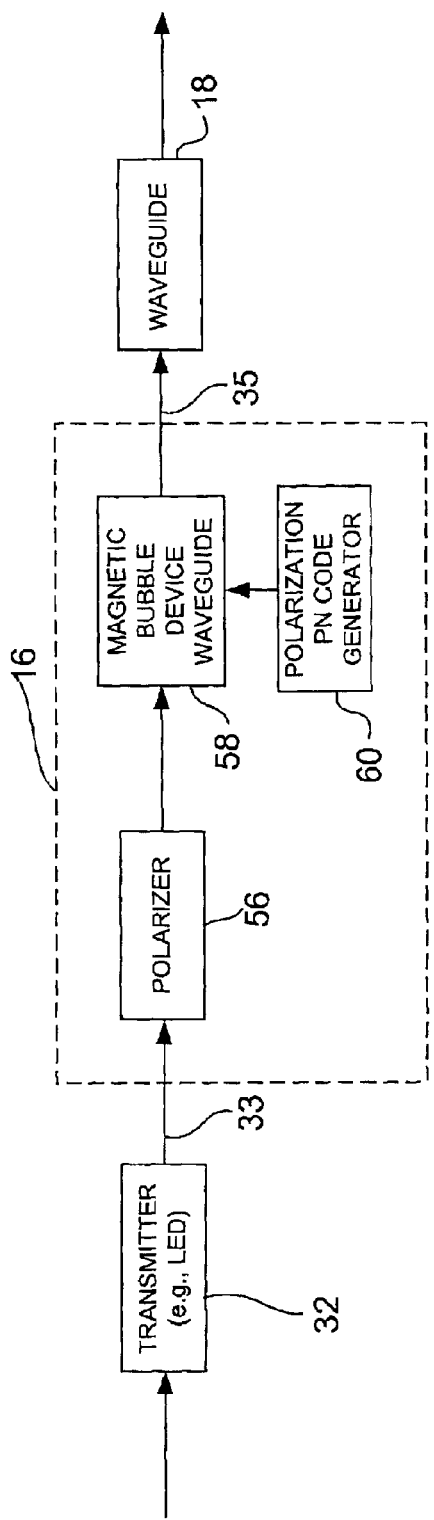
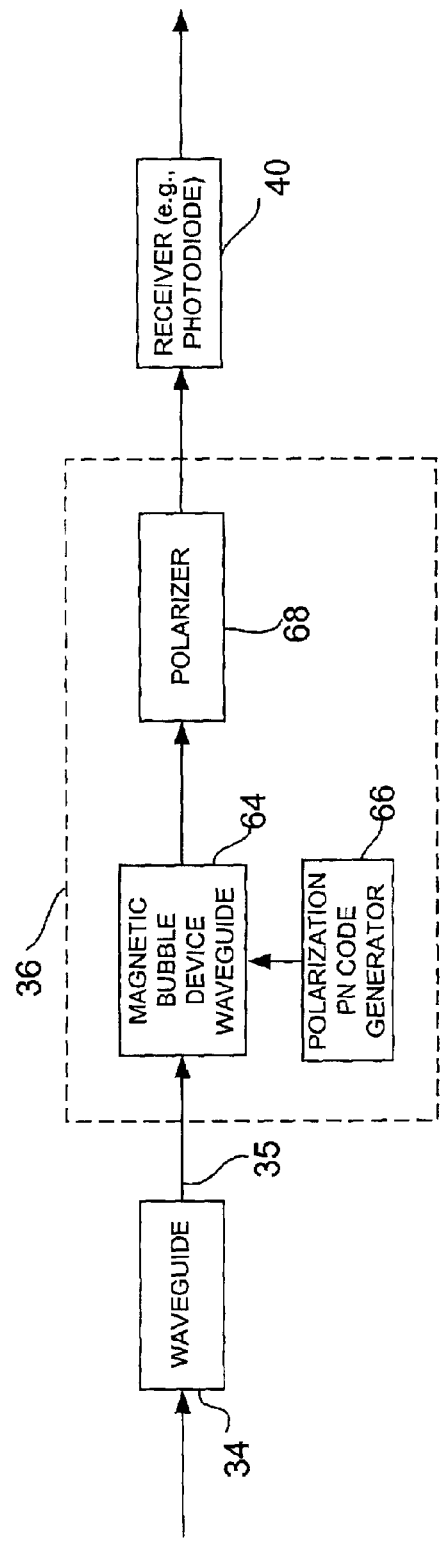

SPREAD POLARIZATION TRANSMITTER AND ASSOCIATED SYSTEM AND METHOD OF OPERATION

FIELD OF THE INVENTION

The present invention relates generally to systems and methods for optical communication and, more particularly, to systems and methods for optical communication using spread-spectrum technology and the polarization of optical signals.

BACKGROUND OF THE INVENTION

In optical communication systems, such as those operating according to spread-spectrum techniques, a transmitted signal is spread over a frequency band that is much wider than the bandwidth of the information being transmitted. Two techniques commonly used in spread-spectrum systems are frequency hopping and direct sequence (DS) modulation. Frequency hopping involves shifting the carrier frequency in discrete increments, in a pattern dictated by a pseudo-random code. In direct sequence modulation, each bit of an information-bearing signal is modulated by a higher frequency, pseudo-random code signal. The modulation may simply comprise reproducing the input code signal when the information bit is one, and inverting the code signal when the information bit is zero. Each bit of the code signal, or each bit of the product signal obtained by modulating the information-bearing signal with the code signal is referred to as a "chip."

In a system using direct sequence modulation, the chip rate, i.e., the frequency of the pseudo-random code signal, is typically much higher than the bit rate of the information-bearing signal. The bandwidth occupied by the transmitted signal is directly determined by the chip rate. A receiver in a direct sequence modulated communication system includes means for producing the same pseudo-random code signal as that used by the transmitter, in the same time epoch. The code signal is employed to decode the transmitted data and extract the information-bearing signal, even in the presence of noise or jamming.

Applications of spread-spectrum systems are various and generally depend upon characteristics of the codes being employed for band spreading and other factors. In direct sequence systems, for example, where the code is a pseudo-random sequence, the transmitted signal acquires the characteristics of noise, making the transmission indiscernible to any eavesdropper who is incapable of decoding the transmission. In this regard, system sensitivity to interference is fundamentally altered. The use of noise-like modulation carrier signal, occupying the same frequency spectrum as all other users, creates effective noise that equals the sum of all the other user signals. Thus, the effective signal-to-noise (S/N) ratio at the receiver is increased because the noise is no longer a worst-case interference signal (as previously required), but instead the average interference of the summed signals from the other users.

In addition to the benefits of making the transmission indiscernible to eavesdroppers, and decreasing the sensitivity to system receivers, spread-spectrum techniques can also increase the data channel density available in a frequency channel. By spreading each bit of an information-bearing signal over a bandwidth of frequencies determined by the pseudo-random code signal, the amount of data that can be transmitted over a given frequency channel is increased over traditional narrow-band systems.

Whereas spread-spectrum communications provide a large number of benefits over traditional communication techniques, conventional spread-spectrum communications systems also have their limitations. In this regard, just as the effective noise in a channel is the sum of signals on the channel, the energy density of each channel has an upper maximum where the waveguide for the channel becomes saturated. Additionally, in optical transmission, a phenomenon known as polarization dispersion occurs when optical signals travel over long distances. Polarization dispersion is an effect caused in light that travels in multiple polarization modes. When a waveguide, such as an optical fiber, is asymmetric in all directions, the light traveling along one polarization can end up traveling at a speed different than light traveling in another direction. If the light spreads enough, the signal can overlap with other light signals and, thus, corrupt the both signals.

SUMMARY OF THE INVENTION

In light of the foregoing background, the present invention provides a spread polarization transmitter and an associated system and method of operation that increases data channel density over conventional spread-spectrum systems, while reducing the problems associated with polarization dispersion. In this regard, the spread polarization transmitter and associated system and method of operation modulate light signals according to a polarization technique as well as a spread-spectrum technique. By further modulating a spread-spectrum modulated signal, the data channel density is increased by the amount of data that can be added to each frequency at different polarization directions. Additionally, by modulating the polarization of signals, polarization dispersion is eliminated because the signal only has one polarization direction.

According to one embodiment, a system for spread polarization communication includes a transmitter and a receiver. The transmitter comprises a spread-spectrum modulation apparatus for spread-spectrum modulating at least one light signal. In a further embodiment, the spread-spectrum modulation apparatus is capable of modulating at least one electrical signal representative of the at least one light signal according to a spread-spectrum method and thereafter converting the electrical signals to the light signals, such as via a light emitting transmitter.

The transmitter also includes a polarization modulator that includes a plurality of magnetic bubble domains, and is configured in accordance with a time-varying pseudo-random polarization code sequence such that the magnetic bubble domains assume a time-varying position representative of the pseudo-random polarization code sequence. In a further embodiment, the polarization modulator further comprises a pseudo-random polarization code generator capable of generating the time-varying pseudo-random code sequence. The polarization modulator is capable of polarizing the spread-spectrum modulated light signals in a polarized direction and thereafter polarization modulating the polarized spread-spectrum modulated light signals during transmission therethrough. Thus, by transmitting the spread-spectrum modulated light signals through the polarization modulator, the system creates at least one spread polarization modulated light signal. Additionally, the transmitter includes a transmission element, such as a waveguide, capable of transmitting the spread polarization modulated light signals.

In another embodiment, the polarization modulator comprises a plurality of polarization modulators disposed in a two-dimensional array. In this embodiment, the transmitter further comprises at least one light spreading element and at least one light focusing element, such as at least one gradient index (GRIN) lens. The light spreading element is capable of spreading the at least one polarized, spread-spectrum modulated light signal into a plurality of polarized, spread-spectrum modulated light signals for input into the array of polarization modulators. Transmitting the at least one spread-spectrum modulated light signal through the array of polarization modulators creates a plurality of spread polarization modulated light signals. Following transmission of the spread-spectrum modulated light signal through the array of polarization modulators, the light focusing element is capable of focusing the plurality of spread polarization modulated light signals into at least one spread polarization modulated light signal.

To receive the spread polarization modulated light signals, the system includes a receiver. Upon reception of the spread polarization light signals, the receiver is thereafter capable of demodulating the spread polarization modulated light signals in accordance with modulation provided by the polarization modulator and thereafter with modulation provided by the spread-spectrum modulation apparatus to thereby obtain a representation of the at least one light signal. In a further embodiment, the light signals include an original polarization. In this embodiment, the receiver is further capable of polarization filtering the spread polarization modulated light signals after demodulating the spread polarization modulated light signals in accordance with the polarization modulator to thereby obtain a representation of the original polarization of the light signals.

In another embodiment where the light signals include an original polarization, the receiver includes a reception element and a polarization demodulator, a polarization filter and a spread-spectrum demodulation apparatus. In this embodiment, the reception element is capable of receiving the spread polarization modulated light signals. The polarization demodulator, which comprises a plurality of magnetic bubble domains, is configured in accordance with a time-varying position representative of an inverse of the time-varying pseudo-random polarization code sequence such that the plurality of magnetic bubble domains assume a time-varying position representative of the inverse of the time-varying pseudo-random polarization code sequence. The polarization demodulator is capable of polarization demodulating the spread polarization modulated light signals during transmission therethrough, where transmitting the spread polarization modulated light signals through the polarization demodulator recreates the spread-spectrum modulated light signals.

The polarization filter is capable of polarization filtering the spread-spectrum modulated light signals as the spread-spectrum modulated light signals pass therethrough to thereby obtain a representation of the original polarization of the light signals. And the spread-spectrum demodulation apparatus is capable of spread-spectrum demodulating the spread-spectrum modulated light signals to thereby recreate the light signals. In one embodiment, the spread-spectrum demodulation apparatus is capable of converting the spread-spectrum modulated light signals into spread-spectrum modulated electrical signals representative of the spread-spectrum modulated light signals, such as via a light detecting receiver. Upon converting the spread-spectrum modulated light signals into spread-spectrum modulated electrical signals, the spread-spectrum demodulation apparatus is capable of demodulating the spread-spectrum modulated electrical signals to thereby recreate at least one electrical signal representative of the light signals.

In operation, in a method of transmitting the light signals, spread-spectrum modulated light signals are polarized in a polarized direction. In a further embodiment, before polarizing the spread-spectrum modulated light signals, electrical signals representative of the light signals are modulated according to a spread-spectrum modulation technique. The spread-spectrum modulated electrical signals are then converted to the light signals.

After polarizing the spread-spectrum modulated light signals, the magnetic bubble waveguide is configured in accordance with the time-varying pseudo-random code sequence such that the magnetic bubble domains are in a time varying position representative of the pseudo-random code sequence. In one embodiment, the time-varying pseudo-random code sequence is generated before configuring the magnetic bubble waveguide. Next, the polarized spread-spectrum modulated light signals are transmitted through the magnetic bubble waveguide such that the position of at least one magnetic bubble domain at least partially rotates the spread-spectrum modulated light signals by a predetermined angle from the polarized direction based upon the time-varying position of the magnetic bubble domains.

Therefore, by modulating the polarization of the light signals as well as spread-spectrum modulating the light signals, the spread polarization transmitter and an associated system and method of operation of the present invention increase data channel density over conventional spread-spectrum systems. Also, by further modulating the polarization of a spread-spectrum modulated signal, the data channel density is increased by the amount of data that can be added to each frequency at different polarization directions. Further, modulating the polarization of signals eliminates polarization dispersion because the signal only has one polarization direction.

BRIEF DESCRIPTION OF THE DRAWINGS

Figure 5:
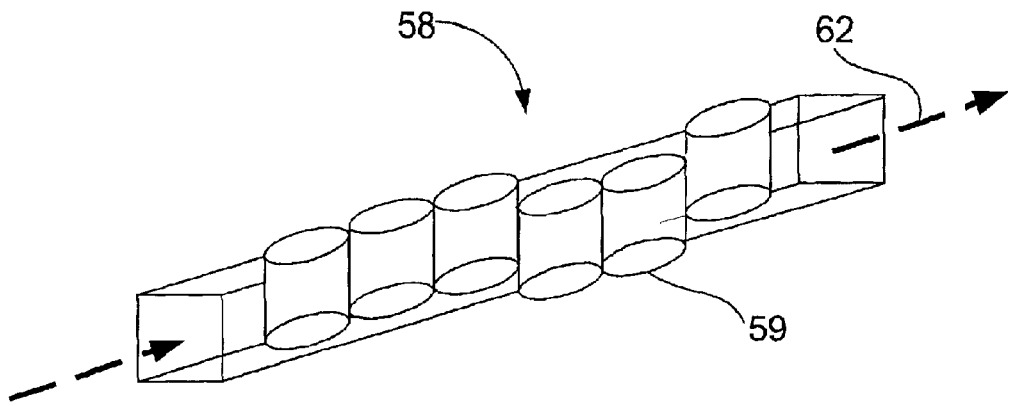
Figure 6A:
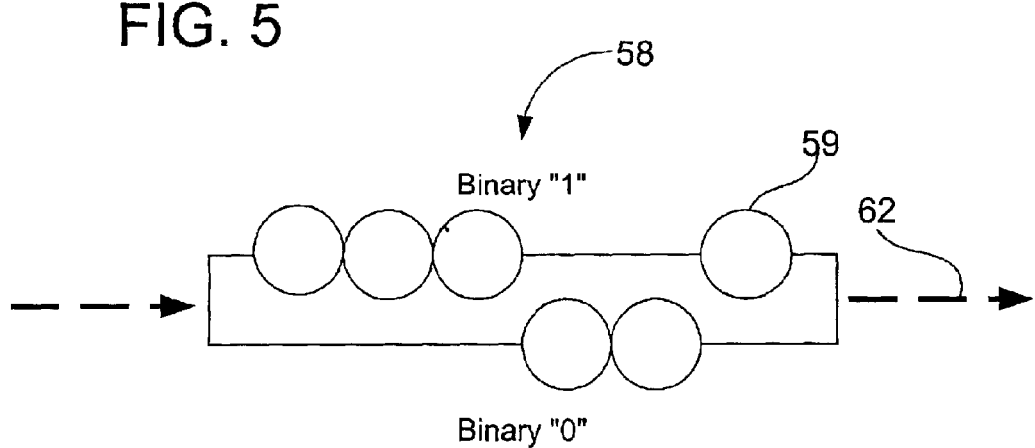
Figure 6B:
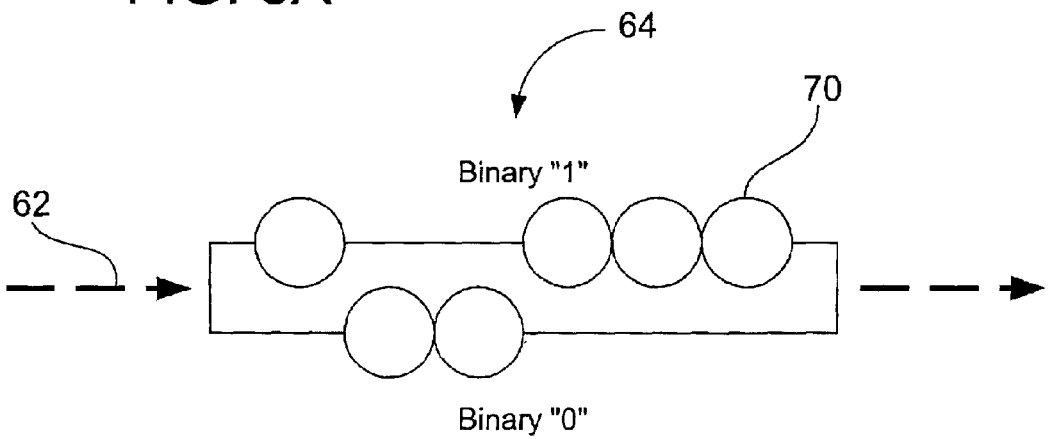
Figure 7:
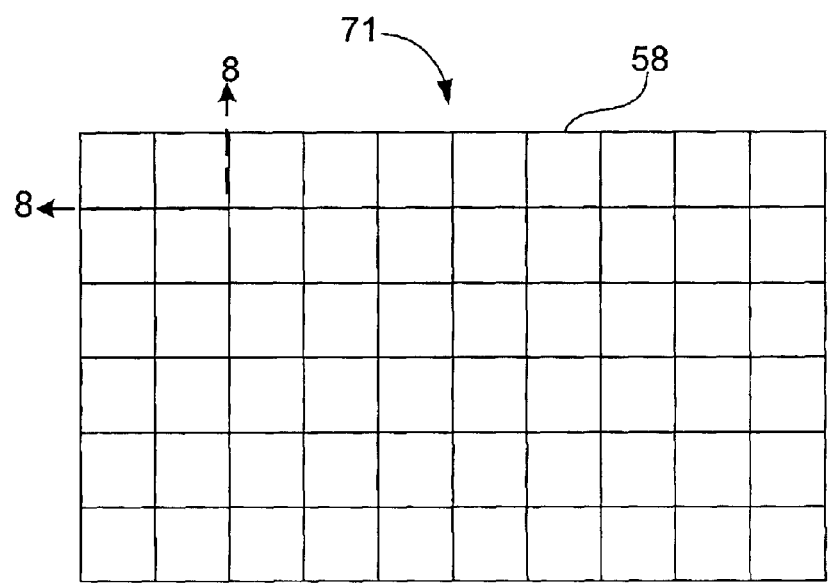
Figure 8:
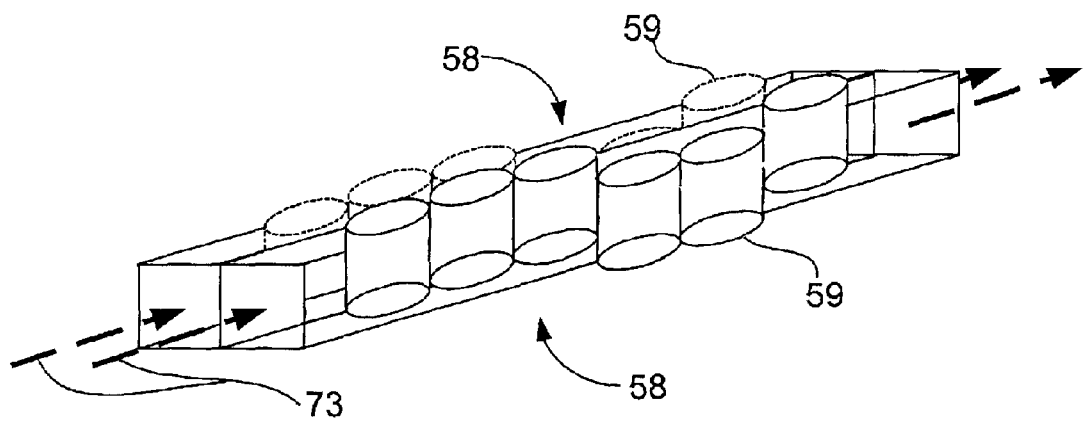
Figure 9:
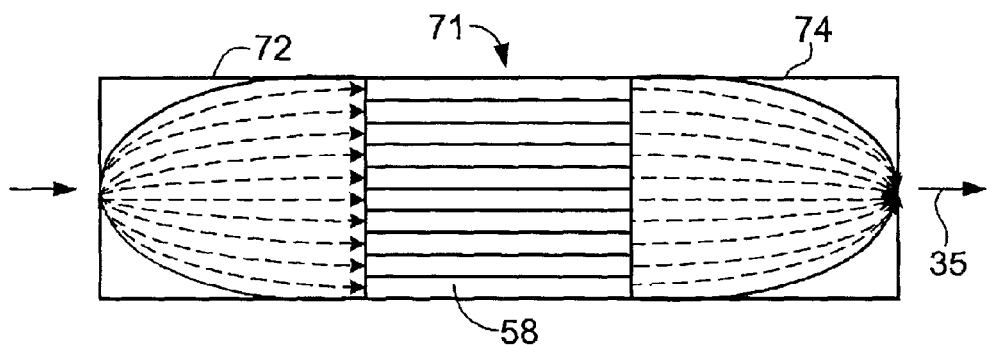

Having thus described the invention in general terms, reference will now be made to the accompanying drawings, which are not necessarily drawn to scale, and wherein:

FIG. 1 is a block diagram of a spread polarization transmitter according to one embodiment of the present invention;

FIG. 2 is a block diagram of a receiver for a spread polarization communication system such as would accompany the spread polarization transmitter illustrated in FIG. 1, according to one embodiment of the present invention;

FIG. 3 is a block diagram of a polarization modulator according to one embodiment of the present invention;

FIG. 4 is a block diagram of one embodiment of a polarization demodulator;

FIG. 5 is a schematic perspective view of a portion of a magnetic bubble device waveguide according to one embodiment of the present invention;

FIGS. 6A and 6B are schematic top views of a portion of a magnetic bubble device waveguide of a polarization modulator and a polarization demodulator, respectively, according to one embodiment of the present invention;

FIG. 7 is a schematic side view of a portion of a two-dimensional array of magnetic bubble device waveguides;

FIG. 8 is a schematic perspective view of two of the magnetic bubble device waveguides of the array illustrated in FIG. 7 taken along line 8; and FIG. 9 is a schematic top view of the portion of the two-dimensional array of magnetic bubble device waveguides including a light spreading element and a light focusing element, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 and 2 illustrate one arrangement for a spread polarization communication system, including a spread polarization transmitter 10 and a receiver 12. FIG. 1 illustrates the spread polarization transmitter 10, which includes a spread-spectrum modulation apparatus 14, polarization modulator 16 and a waveguide 18. The spread-spectrum modulation apparatus includes a digital data source 19, which produces the electrical digital information-bearing signal I(t) to be transmitted. The spread-spectrum modulation apparatus can employ any of a number of different spread-spectrum modulation techniques, such as direct sequencing or frequency hopping, without departing from the spirit and scope of the present invention. For illustrative purposes, however, reference herein will only refer to the direct sequence (DS) technique of spread-spectrum modulation.

The spread-spectrum modulation apparatus further includes a DS modulator 20 that combines the electrical information-bearing signal with a code signal C(t) produced by a pseudo-random number (PN) code generator 22. Code signal C(t) is typically a pseudo-random binary sequence that has many of the characteristics of random noise, but which is deterministic and reproducible by intended receivers. Such signals may be produced by relatively simple circuitry employing shift registers with feedback at selected taps.

Each bit of code signal C(t) is referred to as a "chip". The number of chips per second (the "chip rate") in the code signal C(t) is chosen to be higher than the data rate (bits per second) of the information-bearing signal I(t). Because the chip rate is higher than the data rate, the output of DS modulator 20, comprising the DS modulated electrical signal I(t)C(t), has a broader frequency spectrum than information-bearing signal I(t). The number of chips used to modulate each bit of signal I(t) represents a fundamental design parameter of the system, since it represents the degree by which the bandwidth of the information-bearing signal will be spread for transmission.

The DS modulated signal 24 is input to an intermediate frequency (IF) modulator 26, and modulated onto an IF carrier produced by an IF oscillator 28. The result is an IF electrical signal 30 that is input to a transmitter block 32, such as a laser diode or light emitting diode. In general, IF modulator 26 may employ virtually any type of signal modulation, such as phase shift, frequency shift, and minimum shift keying (MSK) modulation. In phase shift modulation, each chip of DS modulated signal 24 controls the phase of the IF carrier, while in frequency shift modulation, each chip controls the frequency of the IF carrier. In MSK modulation, the DS modulated signal is separated into even and odd chip sequences, and the even and odd chip sequences are then modulated onto a pair of IF carriers that are in quadrature relationship with one another.

The transmitter block converts the IF electrical signal 30 into an IF light signal 33, and transmits the signal to the polarization modulator 16. The polarization modulator, in turn, modulates the polarization of the IF light signal with a pseudo-random polarization code signal to thereby obtain a spread polarization modulated light signal 35, as described below. The spread polarization signal is then transmitted from the spread polarization transmitter via the waveguide 18, which can comprise any of a number of objects such as a fiber optic cable.

Attention is now drawn to FIG. 2, which illustrates a receiver 12 for receiving the data transmitted by the spread polarization transmitter 10 of FIG. 1. The receiver includes a waveguide 34, a polarization demodulator 36 and a spread-spectrum demodulation apparatus 38. The spread-spectrum demodulation apparatus includes a receiver block 40, a demodulator 42, a local IF oscillator 44, a correlator 46, and a PN code generator 48. The spread polarization modulated light signal is received by waveguide 34 and thereafter passed to the polarization demodulator. The polarization demodulator essentially demodulates the polarization of the spread polarization signal with a pseudo-random code that is the inverse of the pseudo-random code applied to the IF light signal in the transmitter to thereby retrieve a representation of the original IF light signal 50, as described below.

From the polarization demodulator, the IF light signal 50 is transmitted to the receiver block 40 of the spread-spectrum demodulation apparatus. The receiver block, which can comprise any of a number of devices such as a photodiode, down-converts the IF light signal to produce an IF electrical signal 52. Demodulator 42 receives the IF electrical signal and, using the local IF oscillator 44, essentially inverts the modulation produced by IF modulator 26 in the transmitter to produce DS modulated electrical signal 54. DS modulated signal 54 is then input to correlator 46, which compares the incoming waveform to the code produced by PN code generator 48. This code is identical to the code produced by PN code generator 22 in the transmitter. The output of correlator 46 is the information-bearing electrical signal I(t).

PN code generators 22 and 48 produce pseudo-random sequences that are characterized by a "length," the length being the number of bits produced by the generator before the bit sequence begins repeating. In a typical application, the code sequences are quite long, such that the bit sequence repeat time is measured in hours or days. The receiver includes synchronization circuitry (not shown) for synchronizing code generator 48 with the code produced by code generator 22. The synchronization circuitry is omitted from FIG. 2 for simplicity, and because synchronization per se does not form part of the present invention.

Reference is now made to FIGS. 3 and 4, which highlight the polarization modulator and polarization demodulator, respectively. The polarization modulator includes a polarizer 56, a magnetic bubble device waveguide 58 and a polarization pseudo-random (PN) code generator 60. The polarizer, which can comprise any of a number of conventional devices, inputs the IF light signal and alters the polarization of the IF light signal in a polarized direction, such as in a linear direction. From the polarizer, the fixed polarization IF light signal enters the magnetic bubble device waveguide.

The magnetic bubble device waveguide 58, which is made of a highly anisotropic magnetic material such as Bismuth Iron Garnet, includes a plurality of magnetic bubble domains 59, as shown in FIG. 5. As is known to those skilled in the art, materials such as Bismuth Iron Garnet have a large uniaxial anisotropy, which results in a very simple magnetic domain structure orienting the magnetization of the material normal to the surface of the film. When materials such as Bismuth Iron Garnet are arranged in a thin film and exposed to a constant magnetic field perpendicular to the film, the film supports small regions of cylindrical magnetic domains called "magnetic bubbles," which have a magnetization opposite in direction from the rest of the material. By applying a very brief, but high, external field pulse to the film, the magnetic bubbles can be nudged along the film. Tracks can then be laid on the film to focus the movement of the magnetic bubbles by depositing magnetic material on the surface of the film.

If the tracks are laid in continuous loops, and motive force is applied to the magnetic bubbles with a pair of wire coils (not shown) wrapped around the film and energized with a two-phase voltage, a form of magnetic memory can be formed. In this regard, the presence of a magnetic bubble in a defined region of a loop can represent a binary "1," while the presence of a magnetic bubble in another defined region (or absence of a magnetic bubble altogether) can represent a binary "0," as shown in FIG. 6A. Data can be read and written in a chain of moving magnetic bubbles as they passed by a predefined point in the bubbles' path. In this regard, the magnetic bubble device waveguide has characteristics similar to a conventional magnetic bubble memory device, as such is known to those skilled in the art. For an example of one type of a conventional magnetic bubble memory device that could be implemented as a magnetic bubble device waveguide, see U.S. Pat. No. 3,711,840 issued Jan. 16, 1973 to Copeland, III and assigned to Bell Telephone Laboratories, Inc., the contents of which are hereby incorporated by reference in their entirety.

To utilize the properties of the magnetic bubble device waveguide 16 that allow for reading and writing data, the magnetic bubble device waveguide includes the polarization PN code generator 60, which has similar characteristics to the PN code generator 22. In this regard, the polarization PN code generator generates a time-varying code signal typically comprising a pseudo-random binary sequence that has many of the characteristics of random noise, but which is deterministic and reproducible by intended receivers. Such signals may be produced by relatively simple circuitry employing shift registers with feedback at selected taps. Similar to the chip rate of the code signal, C(t), the time-varying code signal generated by the polarization PN code generator is preferably chosen to be higher than the data rate (bits per second) of the fixed polarization IF light signal.

As the fixed polarization IF light signal enters the magnetic bubble device waveguide 16, a phenomenon known as the Faraday effect causes the polarization of the fixed polarization IF light signal to rotate by a predetermined, Faraday angle. The Faraday effect is the field-induced difference in refraction of the left and right circularly polarized components of the fixed polarization IF light signal that is incident parallel to the magnetic field. By passing the fixed polarization IF light signal through the magnetic bubble device waveguide, the Faraday effect causes the rotation of the polarization plane of the fixed polarization IF light signal by the predetermined Faraday angle, which is typically less than 180° with respect to the magnetic bubble device waveguide.

By manipulating the positions of the magnetic bubbles 59 within the magnetic bubble device waveguide with a polarization PN code sequence generated by the polarization PN code generator 60, the rotation of the polarization of the IF light signal can be controlled such that the fixed polarization IF light signal is polarization modulated to form a spread polarization modulated light signal 62.

Referring now to FIG. 4, after the spread polarization light signal 62 has been received by the receiver 12 (illustrated in FIG. 2), the spread polarization light signal is passed from the waveguide 34 to the polarization demodulator 36. The polarization demodulator includes a magnetic bubble device waveguide 64, a polarization PN code generator 66 and a polarizer 68. As illustrated in FIGS. 3 and 4, the organization of the polarization demodulator is essentially the reverse of the organization of the polarization modulator. As such, the polarization demodulator inputs the spread polarization light signal and demodulates the spread polarization light signal to thereby retrieve a representation of the original fixed polarization IF light signal.

Magnetic bubble device waveguide 64, like magnetic bubble device waveguide 58, includes a plurality of magnetic bubbles 70. Also, in the same manner as magnetic bubble device waveguide 64, by manipulating the positions of the magnetic bubbles 70 within magnetic bubble device waveguide 64 with polarization PN code generator 66, the rotation of the polarization of the spread polarization light signal 62 can be controlled such that the spread polarization modulated light signal is polarization demodulated as the spread polarization light signal passes therethrough to thereby obtain the fixed polarization IF light signal, as shown in FIG. 6B. In this regard, polarization PN code generator 66 generates a time-varying polarization code sequence that is the inverse of the code signal generated by polarization PN code generator 60, as illustrated by comparing FIGS. 6A and 6B.

Polarization PN code generators 60 and 66 produce pseudo-random sequences that are characterized by a "length", the length being the number of bits produced by the generator before the bit sequence begins repeating. In a typical application, the code sequences up to 32 or more bits long. Additionally, polarization PN code generators 60 and 66 can clock the polarization PN code sequence according to a number of different methods, including a synchronous clock signal, or time-sliced clock signal to allow higher modulation frequencies.

After the spread polarization light signal 62 has been polarization demodulated into the fixed polarization IF light signal, the fixed polarization IF light signal travels through polarizer 68, which is configured opposite polarizer 56. In this regard, polarizer 68 converts the fixed polarization IF light signal into a representation of the original IF light signal, which is then transmitted into the receiver block 40, as described above.

In another advantageous embodiment of the present invention, each magnetic bubble device waveguide 58, 64 can comprise a two-dimensional array of magnetic bubble device waveguides 71, as shown in FIGS. 7–9 with reference to the magnetic bubble device waveguide of the transmitter 10. In this embodiment, the two-dimensional array of magnetic bubble device waveguides include a light spreading element 72, such as a gradient index (GRIN) lens, disposed adjacent one end of the array of magnetic bubble device waveguides, as shown in FIG. 9. In this regard, as the fixed polarization IF light signal is transmitted to the array of magnetic bubble device waveguides, in the case of the polarization modulator, the fixed polarization IF light signal first passes through the light spreading element. The light spreading element, in turn, spreads the fixed polarization light signal into a plurality of fixed polarization IF light signals 73 for input into the two-dimensional array of magnetic bubble device waveguides. The individual fixed polarization IF light signals are then passed through the array of magnetic bubble device waveguides. Following polarization modulation, the individual spread polarization modulated light signals are passed through a light focusing element 74, such as a GRIN lens oriented reverse the light spreading element 72. The light focusing element focuses the individual spread polarization modulated light signals into an aggregated spread polarization modulated light signal. The spread polarization modulated light signal is then passed to the waveguide 18, in the case of the spread polarization transmitter 10.

Therefore, by modulating the polarization of the light signals as well as spread-spectrum modulating the light signals, the spread polarization transmitter and an associated system and method of operation of the present invention offer benefits over conventional spread-spectrum communication systems. In this regard, the present invention increases data channel density. Further, the present invention eliminates the polarization dispersion associated with conventional spread-spectrum communication systems because the signal only has one polarization direction.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of transmitting at least one light signal utilizing a magnetic bubble waveguide comprising a plurality of magnetic bubble domains, said method comprising:
   polarizing at least one spread-spectrum modulated light signal in a polarized direction;
   configuring the magnetic bubble waveguide in accordance with a time-varying pseudo-random code sequence such that the plurality of magnetic bubble domains are in a time varying position representative of the pseudo-random code sequence; and
   transmitting the at least one polarized spread-spectrum modulated light signal through the magnetic bubble waveguide such that a position of at least one magnetic bubble domain at least partially rotates the at least one spread-spectrum modulated light signal by a predetermined angle from the polarized direction based upon the time-varying position of the magnetic bubble domains.

2. A method according to claim 1 further comprising generating the time-varying pseudo-random code sequence before configuring the magnetic bubble waveguide.

3. A method according to claim 1 further comprising modulating at least one electrical signal representative of the at least one light signal according to a spread-spectrum modulation technique and thereafter converting the at least one electrical signal to the at least one light signal, wherein modulating the at least one electrical signal occurs before polarizing the at least one spread-spectrum modulated light signal.

4. A method according to claim 3, wherein converting the at least one light signal comprises passing the at least one electrical signal through a light emitting transmitter to thereby generate the at least one light signal.

5. A method according to claim 1, wherein the magnetic bubble waveguide is a plurality of magnetic bubble waveguides arranged in a two-dimensional array, said method further comprising:
   passing the at least one spread-spectrum modulated light signal through a light spreading element such that the at least one spread-spectrum modulated light signal spreads into a plurality of spread-spectrum modulated light signals, wherein transmitting comprises transmitting the plurality of polarized spread-spectrum modulated light signals through the array of magnetic bubble waveguides such that a position of at least one magnetic bubble domain in each magnetic bubble waveguide at least partially rotates at least one of the plurality of spread-spectrum modulated light signals by a predetermined angle from the polarized direction based upon the time-varying position of the magnetic bubble domains, wherein transmitting the plurality of polarized spread-spectrum modulated light signals through the array of magnetic bubble waveguides generates a plurality of spread polarization modulated light signals; and
   passing the plurality of spread polarization modulated light signals through a light focusing element after transmitting the plurality of polarized spread-spectrum modulated light signals such that the plurality of spread polarization modulated light signals are focused into at least one spread polarization modulated light signal.

6. A spread polarization transmitter for transmitting at least one light signal comprising:
   a spread-spectrum communication apparatus for spread-spectrum modulating the at least one light signal; and
   a polarization modulator comprising:
      a polarizer capable of polarizing the at least one spread-spectrum modulated light signal in a polarized direction; and
      a magnetic bubble waveguide configured in accordance with a pseudo-random polarization code sequence such that the plurality of magnetic bubble domains assume a time varying position representative of the pseudo-random polarization code sequence, wherein the magnetic bubble waveguide is capable of receiving at least one polarized, spread-spectrum modulated light signal and at least partially rotating the at least one polarized, spread-spectrum modulated light signal by a predetermined angle from the polarized direction during transmission therethrough based upon the time-varying position of the magnetic bubble domains to thereby create at least one spread polarization modulated light signal.

7. A spread polarization transmitter according to claim 6 further comprising a transmission element capable of transmitting the at least one spread polarization modulated light signal.

8. A spread polarization transmitter according to claim 6, wherein said polarization modulator further comprises a pseudo-random polarization code generator capable of generating the time-varying pseudo-random code sequence.

9. A spread polarization transmitter according to claim 6, wherein said spread-spectrum communication apparatus is capable of modulating at least one electrical signal representative of the at least one light signal according to a spread-spectrum modulation technique and thereafter converting the at least one electrical signal to the at least one light signal.

10. A spread polarization transmitter according to claim 9, wherein said spread-spectrum communication apparatus includes a light emitting transmitter capable of generating the at least one light signal as the at least one electrical signal passes therethrough.

11. A spread polarization transmitter according to claim 6, wherein the magnetic bubble waveguide comprises a plurality of magnetic bubble waveguides arranged in a two-dimensional array and configured in accordance with at least one pseudo-random polarization code sequence such that the plurality of magnetic bubble domains of each magnetic bubble waveguide assumes a time varying position representative of a respective pseudo-random polarization code sequence, wherein said polarization modulator further comprises:
- at least one light spreading element capable of spreading the at least one polarized, spread-spectrum modulated light signal into a plurality of polarized, spread-spectrum modulated light signals for input into the array of magnetic bubble waveguides, wherein each magnetic bubble waveguide is capable of receiving at least one polarized, spread-spectrum modulated light signal of the plurality of polarized, spread-spectrum modulated light signals and at least partially rotating the at least one polarized, spread-spectrum modulated light signal by a predetermined angle from the polarized direction during transmission therethrough based upon the time-varying position of the magnetic bubble domains, and wherein transmitting the plurality of polarized spread-spectrum modulated light signals through the array of magnetic bubble waveguides generates a plurality of spread polarization modulated light signals; and
- at least one light focusing element capable of focusing the plurality of spread polarization modulated light signals into at least one spread polarization modulated light signal.

12. A spread polarization communication system comprising:
- a transmitter device comprising:
  - a spread-spectrum modulation apparatus for spread-spectrum modulating at least one light signal;
  - a polarization modulator comprising a plurality of magnetic bubble domains, and configured in accordance with a time-varying pseudo-random polarization code sequence such that the plurality of magnetic bubble domains assume a time-varying position representative of the pseudo-random polarization code sequence, wherein said polarization modulator is capable of polarizing the at least one spread-spectrum modulated light signal in a polarized direction and thereafter polarization modulating the at least one polarized spread-spectrum modulated light signal during transmission therethrough, wherein transmitting the at least one spread-spectrum modulated light signal through said polarization modulator creates at least one spread polarization modulated light signal; and
  - a transmission element capable of transmitting the at least one spread polarization modulated light signal; and
- a receiver capable of receiving the at least one spread polarization modulated light signal and thereafter demodulating the at least one spread polarization modulated light signal in accordance with modulation provided by the polarization modulator and thereafter with modulation provided by the spread-spectrum modulation apparatus to thereby obtain a representation of the at least one light signal.

13. A spread polarization communication system according to claim 12, wherein the at least one light signal includes an original polarization, wherein said receiver is further capable of polarization filtering the at least one spread polarization modulated light signal after demodulating the at least one spread polarization modulated light signal in accordance with the polarization modulator to thereby obtain a representation of the original polarization of the at least one light signal.

14. A spread polarization communication system according to claim 12, wherein the at least one light signal includes an original polarization, and wherein said receiver comprises:
- a reception element capable of receiving the at least one spread polarization modulated light signal;
- a polarization demodulator comprising a plurality of magnetic bubble domains, and configured in accordance with a time-varying position representative of an inverse of the time-varying pseudo-random polarization code sequence such that the plurality of magnetic bubble domains assume a time-varying position representative of the inverse of the time-varying pseudo-random polarization code sequence, wherein said polarization demodulator is capable of polarization demodulating the at least one spread polarization modulated light signal during transmission therethrough, wherein transmitting the at least one spread polarization modulated light signal through said polarization demodulator recreates the at least one spread-spectrum modulated light signal;
- a polarization filter capable of polarization filtering the at least one spread-spectrum modulated light signal as the at least one spread-spectrum modulated light signal passes therethrough to thereby obtain a representation of the original polarization of the at least one light signal; and
- a spread-spectrum demodulation apparatus capable of spread-spectrum demodulating the at least one spread-spectrum modulated light signal to thereby recreate the at least one light signal.

15. A spread polarization communication system according to claim 14, wherein said spread-spectrum demodulation apparatus is capable of converting the at least one spread-spectrum modulated light signal into at least one spread-spectrum modulated electrical signal representative of the at least one spread-spectrum modulated light signal and thereafter demodulating the at least one spread-spectrum modulated electrical signal to thereby recreate at least one electrical signal representative of the at least one light signal.

16. A spread polarization communication system according to claim 15, wherein said spread-spectrum demodulation apparatus includes a light detecting receiver capable of converting the at least one spread-spectrum modulated light signal.

17. A spread polarization communication system according to claim 12, wherein said polarization modulator further comprises a pseudo-random polarization code generator capable of generating the time-varying pseudo-random code sequence.

18. A spread polarization communication system according to claim 12, wherein said spread-spectrum modulation apparatus is capable of spread-spectrum modulating at least one electrical signal representative of the at least one light signal and thereafter converting the at least one electrical signal to the at least one light signal.

19. A spread polarization communication system according to claim 18, wherein said spread-spectrum modulation apparatus includes a light emitting transmitter capable of generating the at least one light signal as the at least one electrical signal passes therethrough.

20. A spread polarization communication system according to claim 12, wherein said polarization modulator comprises a plurality of polarization modulators disposed in a two-dimensional array, wherein said transmitter device further comprises:

at least one light spreading element capable of spreading the at least one polarized, spread-spectrum modulated light signal into a plurality of polarized, spread-spectrum modulated light signals for input into the array of polarization modulators, wherein transmitting the at least one spread-spectrum modulated light signal through said plurality of polarization modulators creates a plurality of spread polarization modulated light signals; and at least one light focusing element capable of focusing the plurality of spread polarization modulated light signals into at least one spread polarization modulated light signal.

* * * * *